(12) United States Patent
Kim

(10) Patent No.: US 12,266,776 B2
(45) Date of Patent: Apr. 1, 2025

(54) BATTERY MODULE CAPABLE OF DISSIPATING HEAT

(71) Applicant: H GREEN POWER Inc., Chungcheongbuk-do (KR)

(72) Inventor: Jung-Hwan Kim, Chungcheongbuk-do (KR)

(73) Assignee: H GREEN POWER Inc., Chungcheongbuk-do (KR)

( * ) Notice: Subject to any disclaimer, the term of this patent is extended or adjusted under 35 U.S.C. 154(b) by 466 days.

(21) Appl. No.: 17/686,685

(22) Filed: Mar. 4, 2022

(65) Prior Publication Data

US 2022/0294049 A1    Sep. 15, 2022

(30) Foreign Application Priority Data

Mar. 11, 2021    (KR) .......................... 10-2021-0032167

(51) Int. Cl.
*H01M 10/6551*    (2014.01)
*H01M 10/613*    (2014.01)

(52) U.S. Cl.
CPC ..... *H01M 10/6551* (2015.04); *H01M 10/613* (2015.04)

(58) Field of Classification Search
CPC ........... H01M 10/6551; H01M 10/613; H01M 10/625; H01M 10/647; H01M 10/653; H01M 10/6562; H01M 50/209; H01M 50/24; H01M 10/655; H01M 10/6566; H01M 50/249; H01M 2220/20; Y02E 60/10; B23K 37/003

See application file for complete search history.

(56) References Cited

FOREIGN PATENT DOCUMENTS

| CN | 112260020 A | * | 1/2021 | .......... H01R 25/161 |
|---|---|---|---|---|
| EP | 3136468 A1 | | 3/2017 | |
| JP | 2017016799 A | | 1/2017 | |
| KR | 20170036639 A | | 4/2017 | |
| KR | 10-2019-0020786 A | | 3/2019 | |
| WO | 2017090706 A1 | | 6/2017 | |
| WO | 2019001301 A1 | | 1/2019 | |

OTHER PUBLICATIONS

Search Report dated Aug. 12, 2022, in European Patent Appl'n No. 22160932.4.

* cited by examiner

*Primary Examiner* — Daniel S Gatewood
(74) *Attorney, Agent, or Firm* — Brooks, Cameron & Huebsch, PLLC

(57) ABSTRACT

The present invention relates to a battery module capable of dissipating heat, the battery module preventing thermal damage to a battery cell due to welding heat by dissipating heat generated during welding when assembling a battery module to the outside. The battery module capable of dissipating heat according to the present invention includes a battery cell and cover members accommodating the battery cell, wherein an air-layer groove for blocking heat from the battery cell and the cover members is formed between the cover members and the battery cell.

9 Claims, 4 Drawing Sheets

BATTERY MODULE CAPABLE OF DISSIPATING HEAT

CROSS REFERENCE TO RELATED APPLICATION

The present application claims priority to Korean Patent Application No. 10-2021-003167, filed Mar. 11, 2021, the entire contents of which is incorporated herein for all purposes by this reference.

BACKGROUND OF THE INVENTION

Field of the Invention

The present invention relates to a battery module capable of dissipating heat, the battery module preventing thermal damage to a battery cell due to welding heat by dissipating heat generated during welding when assembling a battery module to the outside.

Description of the Related Art

A battery module used as an energy source for an electric vehicle or the like has a structure in which a plurality of battery cells are arranged inside a cover for being surrounded therewith.

As illustrated in FIG. 1, a cover forming the exterior appearance of a battery module 110 is configured to include a front cover 112 and a side cover 113 into which a battery cell 111 can be inserted. The front cover 112 and the side cover 113 are formed in such a manner as to have a closed structure. That is, the battery cell 111 is inserted into the front cover 112 and the side cover 113, and then respective overlapping portions of the front cover 112 and the side cover 113 are welded to each other.

The battery cell 111 may be damaged when heat (hereafter referred to as "welding heat") generated while the front cover 112 and the side cover 113 are welded to each other is transferred to the battery cell 111 (refer to solid-line arrows in FIG. 1).

In order to prevent this damage, a heat blocking unit 114 is provided between respective portions of the front cover 112 and the side cover 113 that are welded to each other and the battery cell 111. The heat blocking unit 114 blocks the welding heat from being transferred to the battery cell 111, by attaching heat-resistant resin, an insulation material, or a sheet thereto or by coating.

However, although the heat blocking unit 114 is provided, the welding heat is not sufficiently blocked from being transferred by conduction. Therefore, damage to the battery cell 111 due to the welding heat cannot be avoided.

SUMMARY OF THE INVENTION

An objective of the present invention is to provide a battery module capable of dissipating heat, the battery module in which a path along which welding heat is dissipated to the outside is formed in a heat blocking unit provided between respective portions of a front cover and a side cover that are welded to each other and a battery cell.

According to an aspect of the present invention, there is provided a battery module capable of dissipating heat, the module including: a battery cell; and a plurality of cover members accommodating the battery cell, wherein an air-layer groove for blocking heat from the battery cell and the plurality of cover members is formed between the plurality of cover members and the battery cell.

The battery module may further include a heat blocking unit formed between the plurality of the cover members and the battery cell, the heating blocking the heat, wherein the air-layer groove may be formed in the heat blocking unit.

In the battery module, the air-layer groove may be formed in such a manner that a circumference thereof is spaced apart by a predetermined distance from a welding portion of the plurality of cover members, the welding portion being formed by respective overlapping portions of the plurality of cover members that are welded to each other.

In the battery module, the air-layer groove may be formed in a such a manner as to be inclined at a fixed angle in order that the deeper the air-layer groove goes into the heat blocking unit from a surface thereof, the narrower the air-layer groove.

In the battery module, the plurality of cover members may overlap each other, and respective overlapping portions of the plurality of cover members may be welded to each other, thereby forming a welding portion, and the air-layer groove may be formed in a portion of the heat blocking unit that is positioned at the shortest distance to the welding portion.

In the battery module, a heat dissipation path may be formed in the heat blocking unit to a predetermined depth from a surface thereof in such a manner that the inside of the air-layer groove and the outside of the heat blocking unit are connected to each other and thus that the outside of the heat blocking unit and the air-layer groove communicate with each other.

In the battery module, the dissipation path may be formed in such a manner that, a bottom surface thereof has the same depth as a bottom surface of the air-layer groove 14a.

In the battery module, the dissipation path my be formed in the heat blocking unit in such a manner that a distance between a welding portion and the outside of the heat blocking unit that are to be connected to each other is shortest, the welding portion being formed by respective overlapping portions of the plurality of cover members that are welded to each other.

In the battery module, the heat dissipation path my be formed perpendicularly to the air-layer groove.

In the battery module, the heat dissipation path may have a smaller cross-sectional area than the air-layer groove.

In the battery module, the heat dissipation path may be formed in such a manner that the deeper the heat dissipation path goes into the heat blocking unit from a surface thereof, the narrower the heat dissipation path.

In the battery module, the plurality of cover members may be a front cover covering a front surface of the battery cell and a side cover covering a lateral surface of the battery cell, respectively.

According to another aspect of the present invention, there is provided a battery module capable of dissipating heat, the module including: a plurality of cover members joined to each other by welding; and a battery cell accommodated inside the plurality of cover members, wherein an air-layer groove for blocking heat from being transferred by conduction from a welding portion to the battery cell is formed between the welding portion and the battery cell, the welding portion being formed by respective overlapping portions of the plurality of cover members that are welded to each other.

The module may further include a heat blocking unit formed between any one of the plurality of the cover members and the battery cell, wherein the air-layer groove is formed by forming a groove in a heat blocking unit to a predetermined depth from a surface thereof.

In the module, an air-layer groove in which the welding portion is accommodated may be formed in a surface of the heat blocking unit that is brought into contact with any one of the plurality of cover members.

In the module, the air-layer groove may be formed in such a manner that a circumference thereof is spaced apart by a predetermined distance from the welding portion.

In the module, the air-layer groove may be formed in such a mariner as to be inclined at a fixed angle in order that the deeper the air-layer groove goes into the heat, blocking unit from the surface thereof, the narrower the air-layer groove.

In the battery module, a heat dissipation path may be formed in the heat blocking unit to a predetermined depth from a surface thereof in such a manner that the inside of the air-layer groove and the outside of the heat blocking unit are connected to each other and thus that the outside of the heat blocking unit and the air-layer groove communicate with each other.

In the battery module, the heat dissipation path may be formed perpendicularly to the air-layer groove.

In the battery module, the heat dissipation path may be formed in such a manner that the deeper the heat dissipation path goes into the heat blocking unit from the surface thereof, the thinner the heat dissipation path.

In the battery module, the heat dissipation path may have a smaller cross-sectional area than the air-layer groove.

In the battery module, the plurality of cover members may be a front cover covering a front surface of the battery cell and a side cover covering a lateral surface of the battery cell, respectively.

With the battery module capable of dissipating heat having the configuration as described above, the heat blocking unit blocks the welding heat from being transferred by convection to the battery cell. Furthermore, the front cover or the side cover is blocked from being brought into direct contact with the heat blocking unit through the heat dissipation path formed in the heat blocking unit. Thus, the welding heat is blocked from being transferred by conduction to the battery cell.

In this manner, the welding heat generated while the front cover and the side cover are welded to each other can be blocked from being transferred not only by convection, but also by conduction. Therefore, the problem of the battery cell being damaged due to the welding heat can be solved.

DETAILED DESCRIPTION OF THE INVENTION

Figure 1:
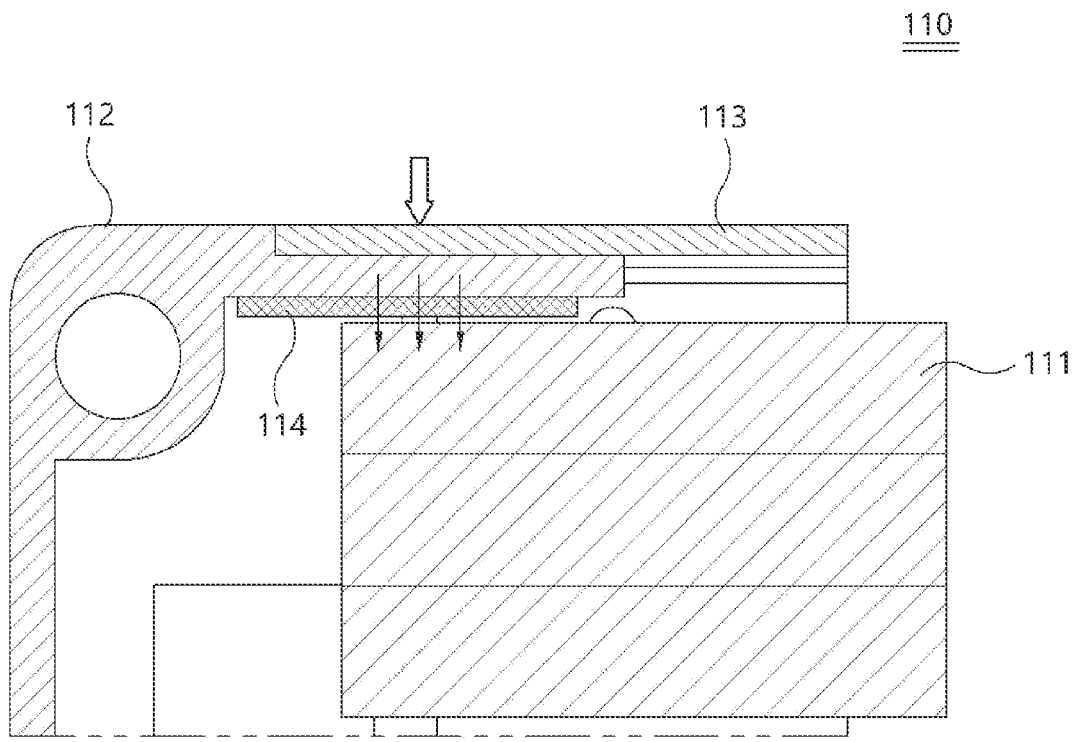
FIG. 1 is a partial cross-sectional view illustrating a battery module in the related art.

A battery module capable of dissipating heat according to the present invention will be described in detail below with reference to the accompanying drawings.

A battery module 10 is configured to have a structure in which a battery cell 11 is accommodated inside a plurality of cover members, for example, cover members 12 and 13. The cover members 12 and 13 are joined to each other by welding. A heat blocking unit 14 is provided between the cover members 12 and 13 and the battery cell 11. The heat blocking unit 14 serves to block heat generated during welding from being transferred to the battery cell 11.

The cover members 12 and 13 are formed of a metal material, such as steel or aluminum, in such a manner as to be capable of being joined to each other by welding.

The heat blocking unit 14 is formed by injection molding, using as a material thereof as synthetic resin, synthetic rubber, or the like. It is desirable that the heat blocking unit 14 is formed of a heat-resistant material, such as ethylene propylene (EP). However, the heat blocking unit 14 may be formed of a non-heat-resistant material, such as polypropylene (PP). Moreover, instead of being formed by injection molding, the heat blocking unit 14 may be formed in the shape of a pad or film.

Two cover members, for example, the cover members 12 and 13 are joined to each other by welding in an overlapping state or in a state where one end of the cover member 12 is brought into contact with one end of the cover member 13. Thus, in the battery module 10, the cover members 12 and 13 constitute a cover that surrounds the battery cell 11. The cover members 12 and 13 will be described below, taking a front cover 12 and a side cover 13 as examples. The front cover 12 covers a front surface of the battery cell 11, and the side cover 13 covers a lateral surface of the battery cell 11.

The front cover 12 and the side cover 13 overlap each other. The respective overlapping portions of the front cover 12 and the side cover 13 are welded to each other, and thus the front cover 12 and the side cover 13 are joined to each other.

The heat blocking unit 14 is formed between any one of the front cover 12 and the side cover 13 and the battery cell 11. The heating blocking unit 14 serves to block heat generated while the front cover 12 and the side cover 13 are welded to each other from being transferred to the battery cell 11. Heat is generated in a welding portion W during welding. The heat blocking unit 14 may block the heat of the welding portion W from being transferred by convection and radiation to the battery cell 11. However, one lateral surface of the heat blocking unit 14 is brought into contact with the battery cell 11, and the other later surface thereof is brought into contact with the front cover 12 or the side cover 13. Because of this, the heat of the welding portion W is not sufficiently blocked from being transferred by conduction to the battery cell 11. In order to solve this problem, according to the present invention, an air layer is formed between the welding portion W and the battery cell 11. The air layer serves to block the heat from being transferred by conduction from the welding portion W to the battery cell 11 during welding.

The air layer is formed by forming an air-layer groove 14a in the heat blocking unit 14 to a predetermined depth from a surface of the heat blocking unit 14.

The welding portion W is vertically positioned over the air-layer groove 14a when viewed from the lateral side of the heat blocking unit 14. Thus, the welding portion W can be accommodated into the air-layer groove 14a. The front cover 12 and the side cover 13 overlap each other. The overlapping portions thereof are welded to each other and thus form the welding portion W. The air-layer groove 14a is formed in a portion of the heat blocking unit 14 that is positioned at the shortest distance to the welding portion W.

The air-layer groove 14a is positioned immediately under the welding portion W when viewed from the lateral side of the battery module 10.

In addition, the air-layer groove 14a is formed in a surface of the heat blocking unit 14 that is brought into contact with the front cover 12 or the side cover 13.

Accordingly, due to air inside the air-layer groove 14a, welding heat generated in the welding portion W is blocked from being conducted, and the heat blocking unit 14 blocks convection and radiation of the generated welding heat. Thus, the generated welding heat is not transferred to the battery cell 11.

The air-layer groove 14a is vertically formed in such a manner that a circumference thereof is spaced apart by a predetermined distance G from the welding portion W when viewed from above the heat blocking unit 14. Therefore, a gap occurs between the welding portion W and the air-layer groove 14a. Because of this, the welding heat of the welding portion W can be blocked from being conducted in a direction horizontal to the heat blocking unit 14.

The gap here of the welding portion W and the air-layer groove 14a may range from 0.5 mm to 5 mm and desirably may be set to 1 mm or greater.

Furthermore, the air-layer groove 14a is formed in such a manner that a lateral surface thereof is inclined at a fixed angle in order that the deeper the air-layer groove 14a goes into the heat blocking unit 14 from the surface thereof, the narrower the air-layer groove 14a.

That is, the greater the depth of the air-layer groove 14a, the smaller the width thereof. Furthermore, the width of the air-layer groove 14a is greatest at the surface of the heat blocking unit 14. Thus, sufficient space is provided in the vicinity of the welding portion W, thereby blocking the heat from being transferred by conduction.

The air layer formed in the air-layer groove 14a is heated during welding. Thus, when air stays in the air-layer groove 14a for a long time, heat of the air is transferred to the battery cell 11 through the heat blocking unit 14. Accordingly, a structure is necessary where the inside and outside of the air-layer groove 14a communicate with each other and where the heat inside the air-layer groove 14a can thus be dissipated.

To this end, a heat dissipation path 14b is formed in the heat blocking unit 14 in such a manner that the inside of the air-layer groove 14a and the outside of the heat blocking unit 14 are connected to each other. Thus, the outside of the heat blocking unit 14 and the air-layer groove 14a communicate with each other through the heat dissipation path 14b.

Figure 2:
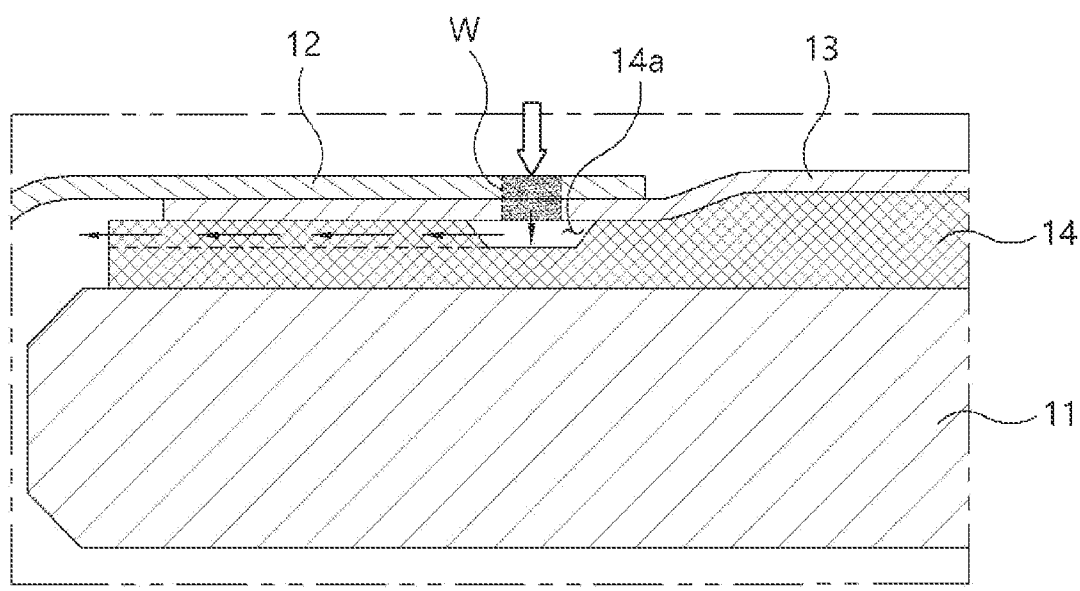
FIG. 2 is a partial cross-sectional view illustrating a battery module capable of dissipating heat according to the present invention.
Figure 3:
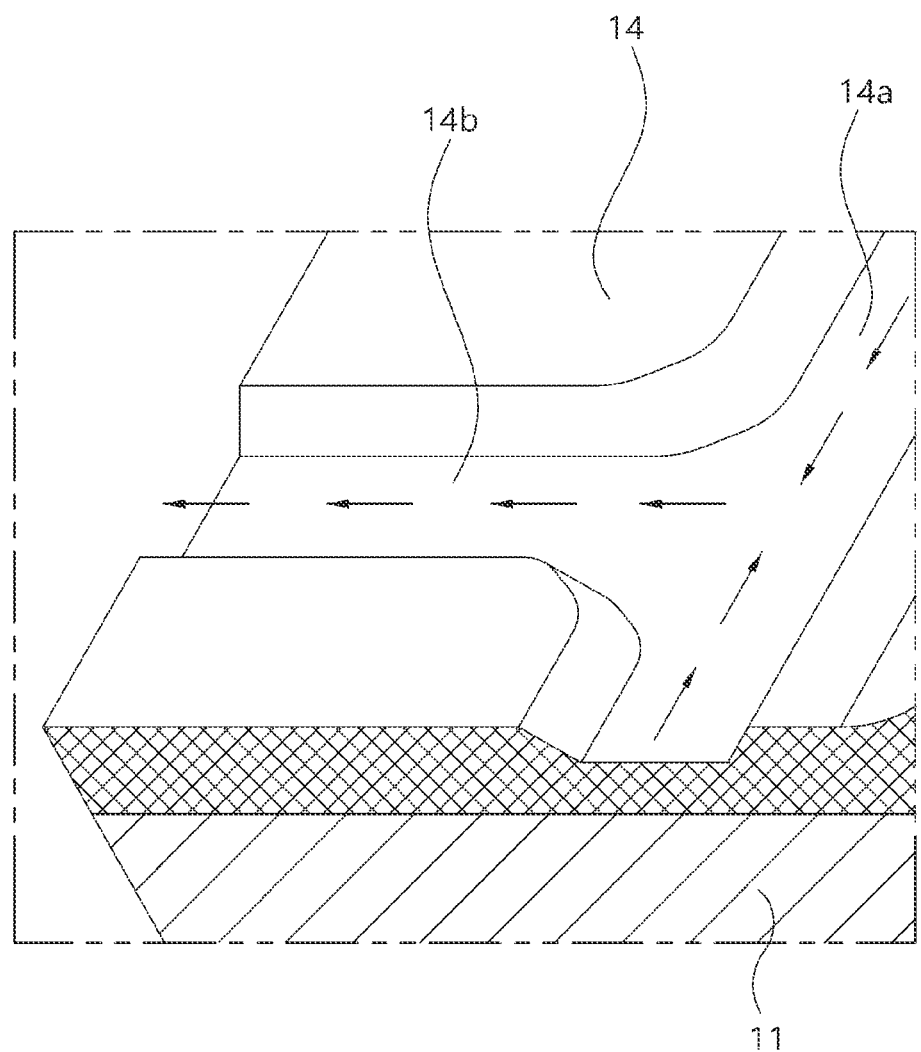
FIG. 3 is a partially exploded perspective view illustrating a process in which heat is dissipated in the battery module capable of dissipating heat according to the present invention.
Figure 4:
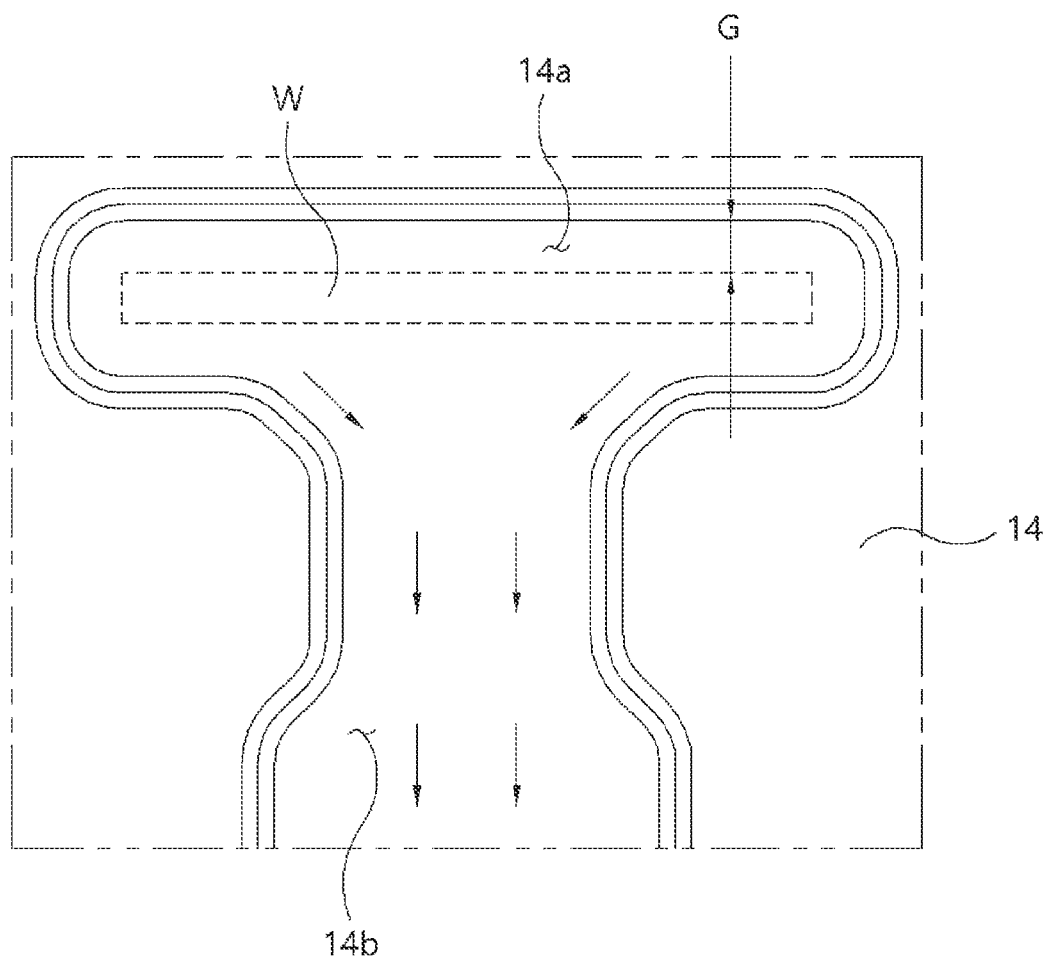
FIG. 4 is a partially enlarged plan view illustrating the process in which heat is dissipated in the battery module capable of dissipating heat according to the present invention.

The heat dissipation path 14b is formed in the heat blocking unit 14 to a predetermined depth from a surface thereof in such a manner that a distance between the air-layer groove 14a and the outside of the heat blocking unit 14 that are to communicate with each other is shortest. Accordingly, the inside and outside of the air-layer groove 14a communicate with each other, and thus the heat inside the air-layer groove 14a can be dissipated. Through the heat dissipation path 14b, the air-layer groove 14a communicates with the outside of the heat blocking unit 14. Therefore, as illustrated by solid-line arrows in FIGS. 2 to 4, the welding heat generated in the welding portion W is dissipated from the air-layer groove 14a through the heat dissipation path 14b to the outside of the heat blocking unit 14. Thus, the welding heat is not transferred to the battery cell 11.

The dissipation path 14b is formed in a surface of the heat blocking unit 14 that is positioned in the same direction as the air-layer groove 14a. The dissipation path 14b is formed in such a manner that a bottom surface thereof has the same depth as a bottom surface of the air-layer groove 14a.

Furthermore, the dissipation path 14b is also formed in such a manner as to be inclined at a fixed angle in order that the deeper the dissipation path 14b goes into the heat blocking unit 14 from the surface thereof, the narrower the dissipation path 14b.

The dissipation path 14b may be formed in such a manner that a width thereof is smaller than a width of the air-layer groove 14a. The reason for this is as follows. Although air temperature is high in the air-layer groove 14a adjacent to the welding portion W, a volume of the cooled air becomes smaller as the dissipation path 14b is more approached.

A portion of the dissipation path 14b that is connected to the air-layer groove 14a is formed in a rounded shape. Thus, the air inside the air-layer groove 14a, when discharged to the outside is caused to flow to the outside without resistance.

| DESCRIPTION OF REFERENCE NUMERALS | |
|---|---|
| 10: battery module | 11: battery cell |
| 12: front cover: | 13: side cover |
| 14: heat blocking unit | 14a: air-layer groove |
| 14b: heat dissipation path | 110: battery module |
| 111: battery cell | 112: front cover |
| 113: side cover | 114: heat blocking unit |
| W: welding portion | |

What is claimed is:

1. A battery module capable of dissipating heat, the module comprising:
    a battery cell; and
    a plurality of cover members accommodating the battery cell,
        wherein an air-layer groove for blocking heat from the battery cell and the plurality of cover members is formed between the plurality of cover members and the battery cell;
    a heat blocking unit formed between the plurality of the cover members and the battery cell, the heat blocking unit blocking the heat generated by welding,
        wherein the air-layer groove is formed in the heat blocking unit, and
        wherein the air-layer groove is formed in such a manner that a circumference thereof is spaced apart by a predetermined distance from a welding portion of the plurality of cover members, the welding portion being formed by respective overlapping portions of the plurality of cover members that are welded to each other.

2. The battery module of claim 1, wherein the air-layer groove is formed in a such a manner as to be inclined at a fixed angle in order that the deeper the air-layer groove goes into the heat blocking unit from a surface thereof, the narrower the air-layer groove.

3. The battery module of claim 1, wherein the plurality of cover members overlap each other, and respective overlapping portions of the plurality of cover members are welded to each other, thereby forming a welding portion, and wherein the air-layer groove is formed in a portion of the heat blocking unit that is positioned at the shortest distance to the welding portion.

4. The battery module of claim 1, wherein a heat dissipation path is formed in the heat blocking unit to a predetermined depth from a surface thereof in such a manner that the inside of the air-layer groove and the outside of the heat blocking unit are connected to each other and thus that the air inside of the air-layer groove flows to the outside of the heat blocking unit through the heat dissipation path.

5. The battery module of claim 4, wherein the dissipation path is formed in such a manner that a bottom surface thereof has the same depth as a bottom surface of the air-layer groove 14a.

6. The battery module of claim 4, wherein the dissipation path is formed in the heat blocking unit in such a manner that a distance between a welding portion and the outside of the heat blocking unit that are to be connected to each other is shortest, the welding portion being formed by respective overlapping portions of the plurality of cover members that are welded to each other.

7. The battery module of claim 4, wherein the heat dissipation path has a smaller cross-sectional area than the air-layer groove.

8. The battery module of claim 4, wherein the heat dissipation path is formed in such a manner that the deeper the heat dissipation path goes into the heat blocking unit from a surface thereof, the narrower the heat dissipation path.

9. The battery module of claim 1, wherein the plurality of cover members are a front cover covering a front surface of the battery cell and a side cover covering a lateral surface of the battery cell, respectively.

* * * * *